United States Patent Office 3,419,546
Patented Dec. 31, 1968

3,419,546
BICYCLIC AND TRICYCLIC ISONITRILES
Uwe Fetzer and Ivar Ugi, Leverkusen, Hans Knupfer, Bergisch-Neukirchen, Johann Albrecht Renner, Leverkusen, and Ferdinand Grewe, Burscheid, Germany, assignors to Farbenfabriken Bayer Aktiengesellschaft, Leverkusen, Germany, a corporation of Germany
No Drawing. Filed July 9, 1965, Ser. No. 470,880
Claims priority, application Germany, July 9, 1964,
F 43,388
24 Claims. (Cl. 260—239)

ABSTRACT OF THE DISCLOSURE

Bicyclic and tricyclic isonitriles having the general formula B—A—N≡C in which A is a direct bond between the radical B and the nitrogen of the isonitrile group, phenylene, or a $C_{1-8}$ aliphatic radical such as alkylene and alkylidene, or such alkylidene which is substituted with phenyl or chlorophenyl; and B is a cyclic member such as bicyclic aliphatic having 4 to 7 members in each individual ring, such bicyclic aliphatic containing a nuclear nitrogen atom, at least one and at most two nuclear carbonyl groups, and/or at least one and at most six chloro substituents, tricyclo heptane, tricyclo decane, tricyclic decene, or such tricyclo decene containing a nuclear nitrogen atom, at least one and at most two nuclear carbonyl groups, and/or at least one and at most six chloro substituents; which may be produced by reacting the corresponding formamide with a water-eliminating acyl halide in the presence of an acid-binding agent; and which possess, alone or in the form of compositions with dispersible carrier vehicles, acaricidal, fungicidal and insecticidal properties.

---

The present invention relates to particular bicyclic and tricyclic isonitriles which have acaricidal, fungicidal and insecticidal properties, to their compositions, as well as to the production and use thereof.

It has already been disclosed that aliphatic and araliphatic isonitriles with 12–25 carbon atoms have insecticidal activity (see U.S. Patent No. 3,012,932). The activity of these compounds, however, is limited to insects.

It has also been disclosed that 2,6-dichloro-phenyl-isocyanide has fungicidal activity (see Belgian Patent No. 625,036). The intensely unpleasant odor of the last-mentioned compound, however, is a disadvantage with respect to its application in practice.

It is an object of the present invention to provide particular bicyclic and tricyclic isonitriles which possess valuable properties.

It is another object of the present invention to provide particular bicyclic and tricyclic isonitriles which exhibit biocidal properties, and especially pesticidal, including insecticidal and acaricidal, properties, as well as fungicidal properties, rendering such bicyclic and tricyclic isonitriles useful in practical applications It is another object of the present invention to provide such bicyclic and tricyclic isonitriles which possess a higher degree of potency than previously known compounds for the same purposes, and especially as regards pesticidal and fungicidal action.

It is another object of the present invention to provide bicyclic and tricyclic isonitriles of the foregoing type which possess distinctly low mammalian toxicity as well as distinctly low phytotoxicity, yet which possess multiple effects which are rapid and long-lasting and which thus are eminently suitable for general hygiene purposes and crop control purposes, such as for combating noxious sucking and biting insects, Diptera, mites, and the like, as well as various phytopathogenic fungi, especially fungus parasites with respect to plant parts above ground.

It is another object of the present invention to provide bicyclic and tricyclic isonitriles of the instant type which are particularly effective against genuine mildew fungi and fungi which attack the plants from the soil.

It is still another object of the present invention to provide for the production of bicyclic and tricyclic isonitriles of the foregoing type in a versatile and efficient manner and in comparatively high yields.

It is still another object of the present invention to provide such a process which contemplates reacting a corresponding bicyclic or tricyclic formamide with a water-eliminating acyl halide in the presence of an acid binding agent or base, whereby to produce the corresponding bicyclic or tricyclic isonitrile.

It is still another object of the present invention to provide such a process in the presence or absence of solvents or diluents, at a reaction temperature within a fairly wide range, including temperatures below room temperature as well as elevated temperatures, utilizing not only normal pressures but also increased and/or reduced pressures, and contemplating a continuous as well as a discontinuous process operation.

It is a further object of the present invention to provide compositions of bicyclic and tricyclic isonitriles of the foregoing type with a carrier vehicle, such as a dispersible carrier liquid or a dispersible carrier solid, with the particular bicyclic or tricyclic isonitrile being present in a biocidally, especially pesticidally, including insecticidally and/or acaricidally, as well as a fungicidally, effective amount.

It is a further object of the present invention to provide compositions of the foregoing type in which the bicyclic or tricyclic isonitrile is present within a wide percentage range of the mixture encompassing both commercial application purposes as well as field application purposes, especially those field application purposes having a particular use.

It is still a further object of the present invention to provide methods of using bicyclic and tricyclic isonitriles in a new way.

It is still a further object of the present invention to provide a method of combating pests, i.e., insects and acarids, by applying to such pests, i.e., insects and acarids, a biocidally effective amount of a bicyclic or tricyclic isonitrile of the instant type, alone or in admixture with a dispersible carrier vehicle of the foregoing type.

It is still a further object of the present invention to provide a method of combating fungi by applying to such fungi a fungicidally effective amount of a bicyclic or tricyclic isonitrile of the instant type, alone or in admixture with a dispersible carrier vehicle of the foregoing type.

It is still a further object of the present invention to provide a particular method for combating fungus parasites on plant parts above ground, and particularly genuine mildew fungi, including fungi which attack the plants from the soil, by applying to such plants and vicinal soil a fungicidally effective amount of a bicyclic or tricyclic isonitrile of the instant type, alone or in admixture with a carrier vehicle of the foregoing type.

Other and further objects of the present invention will become apparent from a study of the within specification and accompanying examples.

It has been found in accordance with the present invention that bicyclic and tricyclic isonitriles having the general formula $$B—A—N≡C \qquad (I)$$

in which A represents a member selected from the group consisting of a direct bond between the radial B and the nitrogen of the isonitrile group, an aromatic radical containing 1 to 2 rings, an aliphatic radical containing 1 to 8 carbon atoms, and an aliphatic radical containing 1 to 8 carbon atoms which is substituted with a member selected from the group consisting of aromatic radicals containing 1 to 3 rings, and chloro-aromatic radicals containing 1 to 3 rings; B represents a cyclic member selected from the group consisting of a bicyclic aliphatic radical, a bicyclic aliphatic radical containing a member selected from the group consisting of at least one nuclear nitrogen atom, at least one nuclear carbonyl group, at least one chloro substituent, and mixtures thereof, a tricyclic aliphatic radical, and a tricyclic aliphatic radical containing a member selected from the group consisting of at least one nuclear nitrogen atom, at least one nuclear carbonyl group, at least one chloro substituent, and mixtures thereof, the individual rings of said cyclic member containing between 4 and 7 members, possess strong acaricidal, insecticidal, and fungicidal properties.

Furthermore, in accordance with the present invention the instant bicyclic and tricyclic isonitriles may be obtained by reacting corresponding bicyclic and tricyclic formamides of the general formula

in which B and A are the same as defined above, with a water-eliminating acyl halide in the presence of an acid binding agent or base.

Surprisingly, the isonitriles according to the present invention not only have higher insecticidal, acaricidal and fungicidal effects than the known biocidal isonitriles, but also multiple effects, for example simultaneous fungicidal and acaricidal effects, whereby a broad spectrum of use is possible. The new compounds according to the present invention thus represent a valuable addition to the art.

In accordance with one particular embodiment of the present invention, when p-(hexachloro-norbornenyl)-formanilide is reacted with phosgene and triethylamine, then the course of the reaction can be illustrated by the following equation:

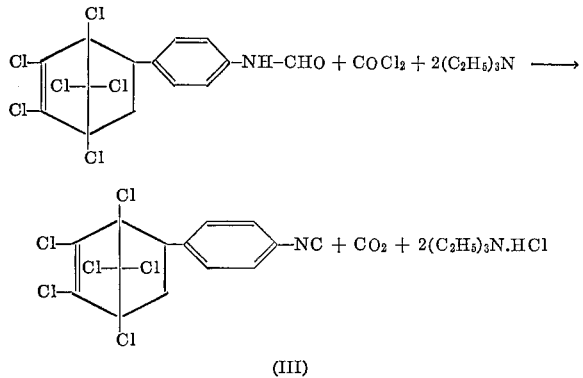

Typical examples of solvents in which the starting materials, which may be used in accordance with the process of the present invention, may be disposed, in solution or suspension, for the elimination of water, include all inert organic solvents, preferably hydrocarbons, such as aliphatic hydrocarbons, especially paraffins, including petroleum fractions such as benzine fractions (B.P. 30–160° C.), especially $C_5$–$C_9$ aliphatic hydrocarbons, and the like; cycloaliphatic hydrocarbons, such as cycloalkyl, and especially cyclo-lower alkyl hydrocarbons, including cyclopentane, cyclohexane, and the like; aromatic hydrocarbons, and especially unsubstituted-, as well as mono-, di-, and tri-lower alkyl substituted-, and nitro substituted-mononuclear aryl hydrocarbons having 6 ring carbon atoms, including benzene, toluene, xylene, mesitylene, nitrobenzene, and the like; halogenated and especially chlorinated aliphatic hydrocarbons including chlorinated lower alkyl and alkenyl hydrocarbons, such as methylene chloride, chloroform, carbon tetrachloride, trichloro-ethylene, tetrachloroethane, and the like; halogenated aromatic and especially halogenated mononuclear aryl hydrocarbons having 6 ring carbon atoms, including mono-, di-, and tri-chlorobenzene, and the like; ethers, such as open chain- and cyclic- aliphatic ethers, and especially di-$C_1$–$C_6$ lower alkyl ethers, including dimethyl-, diethyl-, methylethyl-, diisopropyl-, diisobutyl- ether, and the like, as well as cycloalkyl ethers, including dioxan, furan, tetrahydrofuran, and the like; esters, and especially $C_1$–$C_4$ alkyl-alkanoyloxy esters, including methyl-, ethyl-, propyl-, butyl-, etc. esters of formic, acetic, propionic, butyric, etc. acids, especially ethyl acetate, and the like; nitriles, and especially aliphatic nitriles, such as alkane nitriles, for example $C_1$–$C_4$ lower alkyl cyanides, including acetonitrile, propionitrile, butyronitrile, and the like; tert.-alcohols, especially tert.-butanol, and the like; amines, such as heterocyclic amines, and especially cyclic amines having 6 ring members, including at least one nitrogen atom, including pyridine, as well as tert.-aliphatic amines, such as tri-$C_1$–$C_4$ lower alkylamines, including trimethylamine, triethylamine, tripropylamine, tributylamine, methylethylpropylamine, diethylbutylamine, and the like; ketones, and especially aliphatic ketones, including dialkyl ketones, for example di-$C_1$–$C_4$ lower alkyl ketones, such as acetone, methylethyl ketone, diethyl ketone, methyl isopropyl ketone, methyl isobutyl ketone, and the like; and mixtures of such solvents.

The new bicyclic and tricyclic isonitriles according to the present invention are conveniently obtained from the corresponding formamides by reaction with water-eliminating acyl halides, such as phosgene, alkyl- and aryl-sulfonyl chlorides, phosphorus oxychloride, phosphorus oxybromide or cyanuric chloride, and the like, for example, in the presence of bases.

Typical preferred acid binding agents or bases used in accordance with the present invention include alkali metal carbonates, such as sodium carbonate, potassium carbonate, and the like; tertiary amine, and especially tertiary alkyl amine, such as trimethylamine, triethylamine, diethylmonomethylamine, tripropylamine, tetramethyl-ethylenediamine, dimethylcyclohexylamine, and the like, such alkyl amines thus contemplating $C_1$–$C_6$ trilower alkyl amines having various straight and branched chain substituents, including methyl, ethyl, n-propyl, isopropyl, n-butyl, isobutyl, sec-butyl, tert-butyl, the amyls, and the hexyls, as well as $C_5$–$C_6$ cyclo lower alkyl substituted amines, including cyclopentyl, cyclohexyl, and the like, and corresponding mixed dialkyl- and monocycloalkyl substituted- and monoalkyl-dicycloalkyl substituted-amines wherein the alkyl substituent or substituents and the cycloalkyl substituent or substituents contemplate the foregoing enumerated substituents; dialiphatic-mononuclear araliphatic-amines, and especially di-$C_1$–$C_6$ lower alkyl-mononuclear $C_6$ aryl-$C_1$–$C_6$ lower alkylamines, such as dimethyl-benzyl amine, and the like; $C_6$–$C_{10}$ heterocyclic amines, and especially mononuclear $C_6$ heterocyclic and dinuclear $C_{10}$ heterocyclic amines, such as pyridine, quinoline, and the like; alkali metal tert-alkoxides, potassium-tert-butylate, and the like; and mixtures of suh acid binding agents.

Typical combinations of acyl halides and bases which have proved to be especially satisfactory in accordance with the process of the invention are phosgene and aliphatic tertiary amines, benzene-sulfochloride and pyridine, phosphorus oxychloride and pyridine or potassium-tert-butylate, and cyanuric chloride and potassium carbonate; and the like.

The elimination of water in accordance with the present invention is carried out at a temperature substantially between about —50° and +100° C., preferably at substantially between about —20° and +60° C. 1 mol of the formamide is generally reacted in substantially between about 0.5 and 5 liters of solvent with substantially between about 1–5, preferably 1.8–3, equivalents of base, and substantially between about 0.5–2.5, preferably 0.9–

1.5, water equivalents of acyl halide. The process, of course, may be carried out continuously and/or, if desired, under increased or reduced pressure.

In accordance with the present invention, working up is carried out by mixing the reaction mixture with water, followed by separating and concentrating steps, or the same is carried out by the addition of ammonia, followed by filtration and concentration steps. The crude product can be purified, as the artisan will appreciate, by distillation, washing, crystallization or reprecipitation, if desired with the addition of an adsorbing agent, as the case may be.

Typical examples of the new isonitriles according to the present invention include:

7,7-dimethyl-bicyclo[3,1,1]heptane-2-isocyanide;
bicyclo[2,2,1]heptane-2-isocyanide;
1,7,7-trimethyl-bicyclo[2,2,1]heptane-2-isocyanide;
2,3,3-trimethyl-bicyclo[2,2,1]heptane-2-isocyanide;
1,7,7-trimethyl-bicyclo[2,2,1]heptane-2-one-3-isocyanide;
2-phenyl-1,4,5,6,7,7-hexachloro-bicyclo[2,2,1]$\Delta^5$-heptene-2'-isocyanide;
2-phenyl-1,4,5,6,7,7-hexachloro-bicyclo[2,2,1]$\Delta^5$-heptene-4'-isocyanide [Compound III, i.e., p-(hexachloronor-bornenyl)-phenyl isocyanide];
2,3-(1'-isocyano-1,3-propano)-bicyclo[2,2,1]heptane;
2,3-(1'-isocyano-1,3-propano)-bicyclo[2,2,1]$\Delta^5$-heptene (Compound XII, i.e., 3-isocyano-tricyclo[5,2,1,0,$^{2,6}$]dec-8-ene);
2,3-(1'-isocyano-$\Delta^2$-1,3-propano)-1,4,5,6,7,7-hexachloro-bicyclo[2,2,1]$\Delta^5$-heptene;
4-(1',4'-methano-hexahydro-phthalimido)-phenyl isocyanide;
8-methyl-8-aza-bicyclo[3,2,1]-octane-3-isocyanide;
3-($\beta$-isocyano-ethyl)-3-aza-bicyclo[3,2,2]nonane (Compound V);
3,3-dimethyl-2-(2'-isocyano-2'-phenyl-ethylidene)-bicyclo[2,2,1]heptane [Compound IV, i.e., 3,3-dimethyl-2-($\beta$-isocyano-$\beta$-phenyl-ethylidene)-nor-bornane];
2-isocyanomethyl-bicyclo[2,2,1]$\Delta^5$-heptene (Compound VI, i.e., norbornenyl-methyl isocyanide);
2-isocyanomethyl-1,4,5,6,7,7-hexachloro-[2,2,1]-$\Delta^5$-heptene (Compound VII, i.e., hexachloro-nor-bornenyl methyl isocyanide);
3,3-dimethyl-2-(2'-isocyano-ethylidene)-bicyclo-[2,2,1]heptane [Compound VIII, i.e., 3,3-dimethyl-2-($\beta$-isocyano-ethylidene)-norbornane];
3,3-dimethyl-2-(2'-isocyano-2'-o-chlorophenyl-ethylidene)-bicyclo[2,2,1]heptane (Compound IX, i.e., 3,3-dimethyl-2-[$\beta$-isocyano-$\beta$-o-chlorophenyl-ethylidene]-norbornane);
4-(3',4',5',6'-tetrachloro-$\Delta^{4'}$-1',2',3',6'-tetrahydro-3',6'-dichloromethano-phthalimido)-phenyl isocyanide (Compound X, i.e., 1,2,3,4,7,7-hexachloro-norbornene-dicarboxylic acid-4-isocyano-phenyl-imide);
2-isocyano-tricyclo [2,2,1,0,$^{3,5}$]heptane (Compound XI);
and the like.

The particular new compounds according to the present invention have strong insecticidal and acaricidal effects but a low toxicity towards warm-blooded creatures and a low phytotoxicity as well. The biocidal effects appear rapidly and are long-lasting. The instant compounds can, therefore, be used with extremely good results for combating noxious sucking and biting insects, Diptera and mites, and the like.

In this regard, the sucking insects contemplated herein essentially include aphids, such as the peach aphid (*Myzus persicae*); coccids, such as *Aspidiotus hederae*; Thysanoptera, such as *Hercinothrips femoralis;* and bugs, such as the beet leaf bug (*Piesma quadrata*); and the like.

Also, the biting insects essentially include, for example, butterfly larvae, such as *Plutella maculipennis*; beetles, such as the grain weevils (*Calandra granaria*), but also species living in the soil, such as wire worms (*Agriotes sp.*); cockroaches, such as the German cockroach (*Blattella germanica*); Orthoptera, such as the cricket (*Gryllus domesticus*); termites, such as Reticulitermes; Hymenoptera, such as ants; and the like.

Furthermore, the Diptera generally contemplated essentially comprise the flies, such as the banana fruit fly (*Drosophila melanogaster*), the house fly (*Musca domestica*), and gnats, such as the mosquito (*Aedes aegypti*) and the like.

In this connection, especially important among the mites are the spider mites (tetranychidae), such as the common spider mite (*Tetranychus telarius*); gall mites, such as the red currant gall mite (*Eriophyes ribis*), and Tarsonemides, such as *Tarsonemus pallidus*, and ticks; and the like.

Because of their fungicidal properties, the new isonitriles of the present invention can also be used effectively against phytopathogenic fungi, especially against fungus parasites on plant parts above ground, particularly against genuine mildew fungi, e.g., Erysiphe species, and species of the genus Podosphaera (e.g. apple mildew), and fungi-causing Tracheomycosis, which attack the plants from the soil, such as Fusarium species.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powder, dusting agents, granulates, etc. These are prepared in known manner, for instance by extending the active agents with solvents and/or dispersible solid carriers optionally with the use of emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles or assistants for this purpose: solvents, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.) ketones (for instance, acetone, etc.), and water; dispersible finely divided solid carriers, such as natural ground minerals (for instance, kaolins, alumina, silica, chalk, i.e., calcium carbonate, talc, kieselguhr, etc.), and synthetic ground minerals (for instance, highly dispersed silicic acid, silicates, e.g., alkali silicates, etc.); emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercial preparations, these generally contemplate carrier composition mixtures in which the active compound is present in an amount substantially between about 0.1–95% by weight, and preferably 0.5–90% by weight of the mixture, whereas carrier composition mixtures suitable for direct application or field application generally contemplate those in which the active compound is present in an amount substantially between about 0.01 and 5% by weight of the mixture. Thus such mixtures over-all contemplate an amount of the active compound which is effective for the purpose in question and which is generally between about 0.01 and 95% by weight of the mixture. Thus, the instant formulations or compositions are applied in the usual manner, for example, by watering, spraying, atomizing, vaporizing, scattering, and the like.

The following examples are given for the purpose of illustrating, while not limiting, the utility of the new compounds according to the present invention.

Example 1.—Plutella test

Solvent: 3 parts by weight dimethyl formamide.
Emulsifier: 1 part by weight alkyl-aryl polyglycol ether.

To produce a suitable preparation of the particular active compound, 1 part by weight of such active compound is mixed with the stated amount of solvent containing the stated amount of emulsifier, and the concentrate obtained is then diluted with water to the desired concentration.

Cabbage leaves (*Brassica oleracea*) are sprayed with the preparation of the given active compound until dew moist and infested with the caterpillars of the diamond-back moth (*Plutella maculipennis*).

After the specified period of time, the degree of destruction is determined percentagewise. 100% indicates that all the caterpillars are killed, whereas 0% indicates than none of them is killed.

The active compound, its concentration, the evaluation time and the results obtained can be seen from Table 1 which follows:

TABLE 1.—PLANT-DAMAGING INSECTS

| Active Compound | Concentration of Active Compound in percent | Degree of destruction in percent after 4 days |
|---|---|---|
| 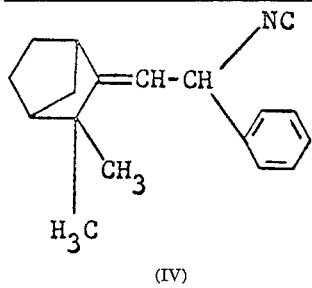 (IV) | 0.2 | 100 |

Example 2.—Drosophila test

Solvent: 3 parts by weight dimethyl formamide.
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the concentrate obtained is then diluted with water to the desired concentration.

1 cc. of the preparation of the given active compound is applied with a pipette to a filter paper disc of 7 cm. diameter. The wet disc is placed in a glass vessel containing 50 banana fruit flies (*Drosophila melanogaster*) and covered with a glass plate.

After the specified period of time, the destruction is determined percentagewise; 100% indicates that all of the flies are killed, whereas 0% indicates that one of them is killed.

The active compound, its concentration, the evaluation time and the degree of destruction can be seen from Table 2 as follows:

TABLE 2.—PLANT-DAMAGING INSECTS

| Active compound | Concentration of active compound in percent | Degree of destruction in percent after 24 hours |
|---|---|---|
| 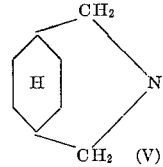 (V) | 0.2 | 100 |

Example 3.—Myzus test (contact action)

Solvent: 3 parts by weight dimethyl formamide.
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the concentrate thus obtained is diluted with water to the desired concentration.

Cabbage plants (*Brassica oleracea*), which have been heavily infested with peach aphids (*Myzus persicae*), are sprayed with the preparation of the given active compound until dripping wet.

After the specified period of time, the degree of destruction is determined percentage wise. 100% indicates that all of the aphids are killed, whereas 0% indicates that none of them is killed.

The active compound, its concentration, the evaluation time and the results obtained can be seen from Table 3 which follows:

TABLE 3.—PLANT-DAMAGING INSECTS

| Active Compound | Concentration of Active Compound in percent | Degree of destruction in percent after 24 hours |
|---|---|---|
| 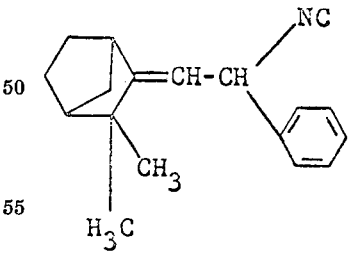 (IV') | 0.2 | 100 |

Example 4.—Tetranychus test

Solvent: 3 parts by weight dimethyl formamide.
Emulsifier: 1 part by weight alkyl-aryl polygylcol ether.

To produce a suitable preparation of the particular active compound, 1 part by weight of such active compound is mixed with the stated amount of solvent containing the stated amount of emulsifier, and the concentrate thus obtained is diluted with water to the desired concentration.

Bean plants (*Phaseolus vulgaris*), which have a height of approximately 10–30 cm., are sprayed with the preparation of the given active compound until dripping wet. These bean plants are heavily infested with bean spider mites (*Tetranychus telarius*) in all stages of development.

After the specified period of time, the effectiveness of the preparation of such active compound is determined by counting the dead mites. The degree of destruction thus obtained is expressed percentagewise: 100% indicates that all of the spider mites are killed, whereas 0% indicates that none of them is killed.

The active compound, its concentration, the evaluation time and the results obtained can be seen from following Table 4:

TABLE 4.—PLANT-DAMAGING MITES

| Active Compound | Concentration of Active Compound in percent | Degree of destruction in percent after 8 days |
|---|---|---|
| 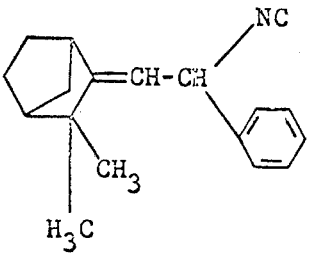 (IV'') | 0.2 | 90 |

Example 5.—Doralis Test (contact action)

Solvent: 3 parts by weight dimethyl formamide.
Emulsifier: 1 part by weight alkylaryl polygylcol ether.

To produce a suitable preparation of the particular active compound, 1 part by weight of such active compound is mixed with the stated amount of solvent containing the stated amount of solvent containing the stated amount of emulsifier, and the concentrate thus obtained is diluted to the desired concentration.

Bush bean plants (*Vicia faba*) which have been strongly infested with black bush bean aphids (*Doralis fabae*) are sprayed with the preparation of the active compound until dripping wet.

After the specified period of time, the degree of destruction is determined percentagewise: 100% indicates that all of the aphids are killed, whereas 0% indicates that none of them is killed.

The active compound, its concentration, the evaluation time and the results obtained can be seen from Table 5 as follows:

TABLE 5.—PLANT-DAMAGING INSECTS

| Active compound | Concentration of active compound in percent | Degree of destruction in percent after 24 hours |
|---|---|---|
| 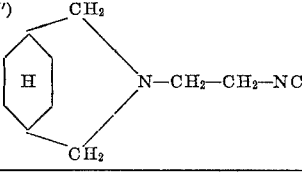 (V') | 0.2 | 80 |

Example 6.—Erysiphe Test

Parts by weight
Solvent, acetone _____ 4.7
Emulsifier, alkylaryl polyglycol ether _____ 0.3
Water _____ 95

The amount of the particular active compound required for the desired concentration in the spray liquor is mixed with the stated amount of the solvent, and the concentrate thus obtained is diluted with the stated amount of water containing the emulsifier.

Young cucumber plants (Delikatess variety) with about three foliage leaves are sprayed with the spray liquor until dripping wet. The cucumber plants are kept in a greenhouse for 24 hours to dry. They are then inoculated by dusting with conidia of the fungus *Erysiphe polyphaga* and placed in a greenhouse at a temperature of 23–24° C. and at a relative atmospheric humidity of about 75%.

After 12 days, the degree of infestation of the treated cucumber plants is determined as a percentage of the untreated but also inoculated control plants. 0% indicates that no infestation occurred and 100% indicates that the infestation is exactly the same as that of the control plants.

The active compound, its concentrations and the results obtained can be seen from Table 6 as follows:

TABLE 6.—ERYSIPHE TEST

| Active Compound | Infestation in percent of infestation of untreated control at a concentration of Active Compound (in percent) of | | | |
|---|---|---|---|---|
| | 0.025 | 0.0062 | 0.0031 | 0.00156 |
| 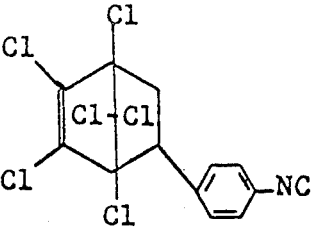 (III') | 0 | 2.5 | 12 | 31 |
| Control | 100 | 100 | 100 | 100 |

As may be seen from Table 6 above, instant compound (III') attains a complete destruction of all fungus at a comparatively low concentration, whereas at the same time by comparison the control plants remain 100% infested. Even at the extremely small concentration of 0.00156%, the infestation is reduced to such an extent that the control represents over three times that amount.

Example 7.—Piricularia Test—liquid preparation of active compound

Parts by weight
Solvent, acetone _____ 1
Dispersing agent, sodium oleate _____ 0.05
Other additives, gelatin _____ 0.2
Water _____ 98.75

The amount of the particular active compound required for the desired concentration of such active compound in the spray liquid is mixed with the stated amount of solvent, and the concentrate thus obtained is diluted with the stated amount of water containing the stated additives.

Thirty rice plants which are about 14 days old are sprayed with the spray liquid until dripping wet. The plants remain in a greenhouse at a temperature of 22–24° C. and at a relative atmospheric humidity of about 70%, until dry. They are then inoculated with an aqueous suspension of 100,000 to 200,000 spores/ml. of *Piricularia oryzae* and placed in a room at 24–26° C. and at a relative atmospheric humidity of 100%.

Five days after inoculation, the infestation of all the leaves of the treated plants, which were present at the time of inoculation, is determined as a percentage of the untreated but also inoculated control plants. 0% indicates that no infestation occurred, while 100% indicates that the infestation is exactly the same as that of the control plants.

The active compound, its concentration and the results obtained can be seen from Table 7 as follows:

TABLE 7.—PIRICULARIA TEST/LIQUID PREPARATION OF ACTIVE COMPOUND

| Active compound | Infestation in percent of infestation of untreated control at a concentration of active compound (in percent) of— | |
| --- | --- | --- |
| | 0.05 | 0.01 |
| (III″) 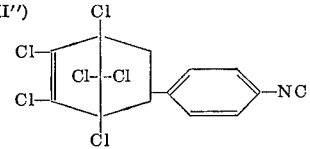 | | |
| Control | 100 | 100 |

As may be seen from Table 7 above, the instant compound (III) achieves 100% destruction of the infesting fungi as opposed to the control, wherein only 0.05% of the active compound is utilized. With the much lower percentage of 0.01% concentration of the active compound, the control is still over 3⅓ times higher in infestation. It should be noted that the 0.01% concentration which indicates a 29% infestation as compared with the 100% infestation of the control is still only ⅕ of the concentration which achieves 100% destruction of the fungi. Accordingly, extremely slight amounts of the instant compounds are still able to provide representative effectiveness and potency for controlling infestation of plant crops.

The following examples are given for the purpose of illustrating, while not limiting, the present invention as regards the production process for the instant compounds.

Example 8

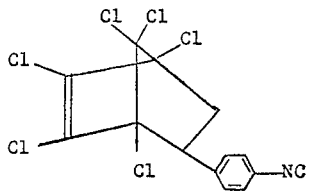

210 parts by weight p-(hexachloro-norbornenyl)-formanilide, 2000 parts by weight methylene chloride and 125 parts by weight triethylamine are heated to boiling, while stirring. After removing the heat source, 55 parts by weight phosgene are introduced at such a rate that the reaction mixture is kept boiling. The residual phosgene is blown off with nitrogen. The mixture is cooled to 10° C. and 40 parts by weight ammonia are rapidly introduced. The mixture is then suction-filtered, the precipitated ammonium chloride which results is washed with methylene chloride and the combined organic phases are concentrated in a vacuum. The crystalline residue is washed wth ether/petroleum ether. Yield: 162 parts by weight p-(hexachloro-norbornenyl)-phenyl isocyanide; M.P. 167–169° C.

Example 9

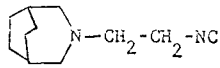

(V″)

196 parts by weight 3-($\beta$-formylamino-ethyl)-bicyclo-[3,2,2]-3-aza-nonane are dissolved in 200 parts by weight triethylamine and 1000 parts by weight methylene chloride. 100 parts by weight phosgene are introduced at 0–10° C., with stirring. The mixture is subsequently saturated with ammonia, filtered, concentrated and the residue distilled in a vacuum. Yield: 150 parts by weight 3-($\beta$-isocyano-ethyl)-bicyclo-[3,2,2]-3-aza-nonane; B.P. 104–106° C./0.1 mm. Hg.

Example 10

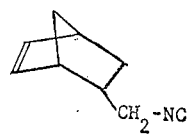

(VI)

30 parts by weight N-formyl-(norbornenyl)-methylamine are dissolved in 200 parts by weight methylene chloride and 40 parts by weight triethylamine. Then, 18 parts by weight phosgene are introduced at 0–10° C., with stirring. Stirring is continued at 25° C. for one hour and the mixture then mixed with 300 parts by weight ice water. The layers which form are separated, and the organic phase is washed with 200 parts by weight water and dried with anhydrous sodium sulfate. The organic layer then is filtered, concentrated in a vacuum and the residue distilled in a high vacuum. Yield: 19 parts by weight (norbornenyl)-methyl isocyanide; B.P. 36–40° C./0.008 mm. Hg.

Example 11

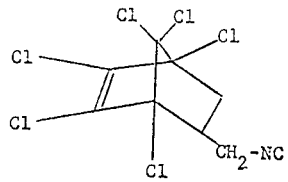

(VII)

54 parts by weight N-formyl-(hexachloronorbornenyl)-methylamine are dissolved in 300 parts by weight methylene chloride and 35 parts by weight triethylamine. Then, 15 parts by weight phosgene are introduced at 0–10° C., with stirring. Stirring is continued at 25° C., for one hour and the mixture then mixed with 300 parts by weight ice water. The layers are separated, and the organic phase is washed with 200 parts by weight of water and dried with anhydrous sodium sulfate. The organic layer then is filtered and concentrated in a vacuum. Yield: 46 parts by weight (hexachloro-norbornenyl)-methyl isocyanide remain as the residue.

Example 12

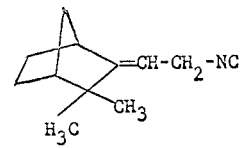

(VIII)

60 parts by weight 3,3-dimethyl-2-($\beta$-formylamino-ethylidene)norbornane, 500 parts by weight methylene chloride and 65 parts by weight triethylamine are heated to boiling. After removing the heat source, 31 parts by weight phosgene are introduced at such a rate that the reaction mixture is kept boiling. The residual phosgene is blown off with nitrogen, the mixture cooled to 10° C. and 11 parts by weight ammonia are rapidly introduced. The mixture is then suction-filtered, the precipitated ammonium chloride washed with methylene chloride, and the combined organic phases are concentrated in a vacuum. The residue consists of 3,3-dimethyl-2-($\beta$-isocyano-ethylidene)norbornane.

Example 13

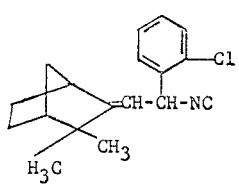

(IX)

190 parts by weight 3,3-dimethyl-2-[β-formylamino-β-(o-dichlorophenyl)-ethylidine] - norbornane 2000 parts by weight methylene chloride and 145 parts by weight triethylamine are heated to boiling, while stirring. After removing the heat source, 70 parts by weight phosgene are introduced at such a rate that the reaction mixture is kept boiling. The residual phosgene is blown off with nitrogen, the mixture cooled to 10° C., and 25 parts by weight ammonia are rapidly introduced. The mixture is then suction-filtered, and the precipitated ammonium chloride washed with methylene chloride. The combined organic phases are concentrated in a vacuum. The residue consists of 3,3-dimethyl-2-[β-isocyano-β-(o-chlorophenyl)-ethylidene]-norbornane.

Example 14

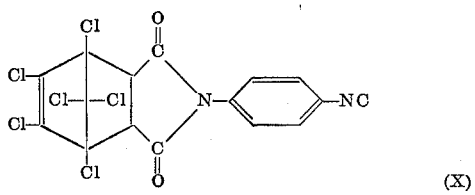

(X)

123 parts by weight 1,2,3,4,7,7-hexachloro-norbornene-dicorboxylic acid-4-formylamino-phenyl-imide are suspended in 550 parts by weight methylene chloride and 75 parts by weight triethylamine. A solution of 28 parts by weight phosgene in 400 parts by weight methylene chloride is added thereto dropwise at boiling temperature within one hour. After sucking off excess phosgene, the mixture is filtered. The filter residue is treated with water. After drying, there remain 73 parts by weight 1,2,3,4,7,7-hexachloro-norbornene-dicarboxylic acid - 4 - isocyanophenyl-imide. A further 13 parts by weight of the product can be obtained by concentration of the mother liquor. Total yield: 90 parts by weight (76% of the theoretical) 1,2,3,4,7,7 - hexachloro-norbornene-dicarboxylic acid-4-isocyanophenyl-imide (decomposition at 260° C.).

Example 15

(XI)

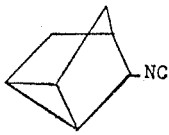

A solution of 55 parts by weight phosgene in 950 parts by weight methylene chloride is added at boiling temperature, in the course of one hour, to a solution of 69 parts by weight 2-formylamino-tricyclo-(2,2,1,0$^{3,5}$)-heptane in 200 parts by weight methylenechloride and 120 parts by weight triethylamine. After removing the phosgene in a vacuum, the mixture is shaken twice with 500 parts by weight of ice water each time. After drying over potassium carbonate, the organic phase is concentrated. In this manner, 45 parts by weight (75% of the theoretical) 2-isocyano-tricyclo-(2,2,1,0$^{3,5}$)-heptane (B.P. 56° C./1 mm. Hg) distil from the residue.

Example 16

(XII)

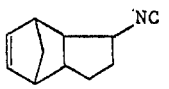

A solution of 35 parts by weight phosgene in 450 parts by weight methylene chloride is added at boiling temperature in the course of one hour to a solution of 60 parts by weight 3-formylamino-tricyclo-(5,2,1,0$^{2,6}$)-dec-8-ene in 400 parts by weight methylene chloride and 80 parts by weight triethylamine. After removing the phosgene in a vacuum, the mixture is shaken twice with 500 parts by weight of ice water each time. After drying over potassium carbonate, the organic phase is concentrated in a vacuum. In this manner, 40 parts by weight (74% of the theoretical 3-isocyano-tricyclo-(5,2,1,0$^{2,6}$)-dec-8-ene (B.P. 73–75 C./0.002 mm. Hg) distil from the residue.

Example 17

The compound 3,3 - dimethyl - 2-(β-isocyano-β-phenyl-ethylidene) - norbornane (Compound IV, i.e., 3,3 - dimethyl-2 - (2' - isocyano - 2' - phenyl - ethylidene)-bicyclo [2,2,1] heptane) may be obtained in a corresponding manner in accordance with the procedure of Example 13, utilizing the corresponding starting material 3,3-dimethyl - 2 - (β - formylamino-β-phenylethylidene)-norbornane with corresponding molar amounts of methylene chloride, triethylamine, and phosgene. In the same way, 7,7-dimethyl-bicyclo [3,1,1] heptane-2-isocyanide; bicyclo [2,2,1] heptane - 2 - isocyanide; 1,7,7-trimethyl-bicyclo [2,2,1] heptane - 2 - isocyanide; 2,3,3 - trimethyl-bicyclo [2,2,1] heptane - 2 - isocyanide; 1,7,7-trimethyl-bicyclo [2,2,1] heptane - 2-one-3-isocyanide; 2-phenyl-1,4,5,6,7,7-hexachloro-bicyclo [2,2,1] Δ$^5$-heptene-2'-isocyanide; 2,3-(1'-isocyano-1,3-propano)-bicyclo [2,2,1] heptane; 2,3-(1' - isocyano - Δ$^2$ - 1,3-propano)-1,4,5,6,7,7-hexachloro-bicyclo [2,2,1] Δ$^5$-heptene; 4-(1',4'-methano-hexahydrophthalimido) - phenyl isocyanide; and 8 - methyl - 8 - azabicyclo [3,2,1]-octane-3-isocyanide, each respectively, may be prepared in an analogous manner, utilizing corresponding molar amounts of the appropriate formylamine starting material, methylene chloride, triethylamine, and phosgene.

All of the foregoing compounds possess the desired biocidal properties, especially pesticidal, including insecticidal and acaricidal, properties, as well as fungicidal properties, in comparatively higher degrees of potency with respect to previously known compounds for such purposes, yet while possessing distinctly low mammalian toxicity and distinctly low phytotoxicity. All of such compounds further possess multiple effects which are rapid and long-lasting and which thus render such compounds suitable for general hygiene purposes and crop control purposes, such as for combating noxious sucking and biting insects, Diptera, mites, and the like, as well as various phytopathogenic fungi, especially fungus parasites with respect to plant parts above ground, including genuine mildew fungi and fungi which attack plants from the soil.

Accordingly, the present invention provides for the production of bicyclic and tricyclic isonitriles of general Formula I hereinabove, by a versatile and efficient process, utilizing a corresponding formamide of Formula II hereinabove with a water-eliminating acyl halide in the presence of an acid binding agent or base, whereby the corresponding isonitriles are obtained in comparatively high yields. The process may be carried out in the presence or absence of solvents or diluents at widely varying temperatures, including temperatures below room temperature as well as elevated temperatures, utilizing not only normal pressures but also increased and/or reduced pressures, as well as continuous or discontinuous process conditions.

The compounds in accordance with the present invention, as aforesaid, may be used in the form of biocidal compositions with carrier vehicles, wherein a biocidally effective amount of the instant isonitrile is present. Of course, the present invention further contemplates methods of combating pests, such as insects and acarids, as well as methods of combating phytopathogenic fungi, by applying to such pests and/or fungi and their habitat and/or vicinal soil, a biocidally, i.e., pesticidally and/or fungicidally, effective amount of the compound of the instant type, alone or in admixture with a carrier vehicle, as aforesaid.

In particular, in accordance with the present invention the symbol B in Formula I herein may be a norbornenyl radical, and even a hexachloro-substituted norbornenyl radical, while the symbol A in such formula may be lower alkylene. Also, such symbol A may alternately be divalent phenyl with the symbol B optionally being a hexachloro-substituted norbornenyl radical. Furthermore, the symbol B may be a norbornane radical, and even a dimethyl-substituted norbornane radical, while the symbol A may be lower alkylidene, such as even a phenyl-substituted lower alkylidene, including chlorophenyl-substituted lower alkylidene. Moreover, the symbol B may represent a bicyclo [3,2,2]-nonane radical, such as an aza-nonane radical, while the symbol A may be lower alkylene. Additionally, the symbol B may represent a tricyclo aliphatic radical, such as a tricyclo heptane or decene, while the symbol A may be a direct bond between the radical B and the nitrogen atom of the isonitrile group of Formula I above.

Preferably, the symbol B contemplates norbornanyl; norbornenyl; hexachloro norbornenyl; norbornenyl dicarboxylic acid imido; hexachloro norbornenyl dicarboxylic acid-imido; dimethyl and trimethyl norbornanyl; trimethyl bicyclo keto heptyl; methyl bicyclo-aza-octyl; bicyclo-aza-nonyl, e.g.; bicyclo [3,2,2]-aza-nonyl; tricyclo heptyl; tricyclo decene -decyl and -decenyl; and hexachloro tricyclo decadienyl, radicals, and the like; whereas preferably the symbol A contemplates lower alkyl and especially $C_1$–$C_4$ lower alkyl, such as methyl, ethyl, n-propyl, iso-propyl, n-butyl, iso-butyl, sec.-butyl, and tert.-butyl; $C_6$ mononuclear aryl radicals, and especially phenyl; alkylidene radicals, especially $C_2$–$C_4$ alkylidene, such as ethylidene, etc. radicals; $C_6$ mononuclear aryl-alkylidene radicals, and especially phenyl $C_2$–$C_4$ alkylidene, such as phenyl ethylidene radicals and chlorophenyl ethylidene radicals; as well as a double bond between the radical represented by the symbol B and the nitrogen atom of the isonitrile group in question. Therefore, among the substituents for the radical of the symbol B are chloro and the keto (or carbonyl) group, and among the substituents for the radical of the symbol A are aromatic groups having 1 to 3 rings, and especially $C_6$ mononuclear aryl radicals, such as phenyl and chlorophenyl. In this connection, it will be realized that the radical of the symbol B contemplates a cyclic aliphatic member, the individual rings of which contain between 4 and 7 ring members, yet such cyclic aliphatic member also contains straight chain groups as a part thereof, such as $C_1$–$C_{12}$ open chain aliphatic groups, for example one or more methyl, ethyl, propyl, butyl, etc., dodecyl, groups attached to the ring structure of the cyclic aliphatic radical contemplated by the symbol B herein. Such open chain aliphatic substituent on the cyclic radical coming within the purview of the symbol B is, therefore, not defined herein as a separate substituent for the cyclic member in question, but rather more broadly the definition of the cyclic member is such as to contemplate specifically cyclo aliphatic as well as open chain aliphatic-cyclo aliphatic radicals, for instance as noted in connection with Compounds IV, VIII, and IX hereinabove.

Thus, in effect the symbol B contemplates saturated and unsaturated as well as substituted and unsubstituted bicyclic and tricyclic aliphatic radicals having 4 to 7 members per ring optionally including at least one interlinking nitrogen atom, whereas the symbol A contemplates (a) saturated and unsaturated as well as substituted and unsubstituted aliphatic radicals, and especially $C_1$–$C_8$ aliphatic radicals; (b) substituted and unsubstituted aromatic radicals, especially those having 1 to 2 rings, such as phenyl, i.e., phenylene; and (c) a direct bond between the radical represented by the symbol B represented by the nitrogen atom of the isonitrile group.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Bicyclic and tricyclic isonitriles having the general formula

B—A—N≡C in which A represents a member selected from the group consisting of a direct bond between the radical B and nitrogen of the isonitrile group; phenylene; alkylene having 1 to 4 carbon atoms; alkylidene having 2 to 4 carbon atoms; and such alkylidene which is mono substituted with a member selected from the group consisting of phenyl and chloro-phenyl and B represents a cyclic member selected from the group consisting of norbornanyl; dimethyl norbornanyl; trimethyl norbornanyl; trimethyl bicyclo keto heptyl; norbornenyl; hexachloro norbornenyl; norbornanyl dicarboxylic acid imido; hexachloro norbornenyl dicarboxylic acid imido; methyl-bicyclo-aza-octyl; bicyclo-aza-nonyl; tricyclo heptyl; tricyclo decyl; tricyclo decenyl; and hexachloro tricyclo decadienyl.

2. Isonitriles according to claim 1 wherein B is norbornenyl and A is alkylene having 1 to 4 carbon atoms.

3. Isonitriles according to claim 2 wherein said norbornenyl is hexachloro substituted.

4. Isonitriles according to claim 1 wherein B is norbornenyl and A is divalent phenyl.

5. Isonitriles according to claim 4 wherein said norbornenyl is hexachloro substituted.

6. Isonitriles according to claim 2 wherein B is norbornanyl and A is alkylidene having 2 to 4 carbon atoms.

7. Isonitriles according to claim 6 wherein said norbornanyl is dimethyl substituted.

8. Isonitriles according to claim 7 wherein said alkylidene is phenyl substituted.

9. Isonitriles according to claim 8 wherein the phenyl substituent is chlorophenyl.

10. Isonitriles according to claim 1 wherein B is bicyclo [3,2,2]-aza-nonyl and A is alkylene having 1 to 4 carbon atoms.

11. Isonitriles according to claim 1 wherein B is bicyclo aza-nonane nonyl and A is alkylene having 1 to 4 carbon atoms.

12. Isonitriles according to claim 1 wherein B is tricyclo heptyl and A is a direct bond between the radical B and the nitrogen atom of the isonitrile group.

13. Isonitriles according to claim 1 wherein B is tricyclo decenyl and A is a direct bond between the radical B and the nitrogen atom of the isonitrile group.

14. Isonitriles according to claim 1 wherein B is tricyclo decyl and A is a direct bond between the radical B and the nitrogen atom of the isonitrile group.

15. The compound 2-phenyl-1,4,5,6,7,7-hexachloro-bicyclo[2,2,1]$\Delta^5$-heptene-4'-isocyanide having the formula

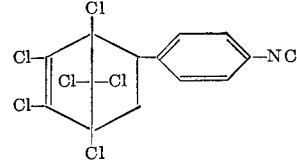

16. The compound 3,3-dimethyl-2-[β-isocyano-β-phenyl-ethylidene]-bicyclo[2,2,1]-heptane having the formula

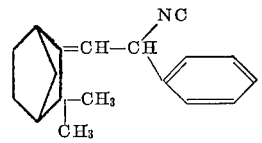

17. The compound 3-(β-isocyano-ethyl)-bicyclo [3,2,2]-3-aza-nonane having the formula

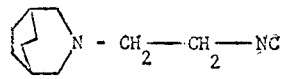

18. The compound 2-(isocyanomethyl)-bicyclo [2,2,1] $\Delta^5$-heptene having the formula

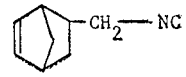

19. The compound 1,4,5,6,7,7-hexachloro-2-(isocyanomethyl)-bicyclo [2,2,1] Δ⁵-heptene having the formula

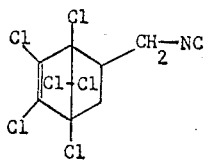

20. The compound 3,3-dimethyl-2-(β-isocyanoethylidene)-bicyclo [2,2,1] heptane having the formula

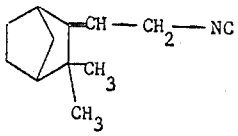

21. The compound 3,3-dimethyl-2-[β-isocyano-β-(o-chlorophenyl)-ethylidene]-bicyclo [2,2,1] heptane having the formula

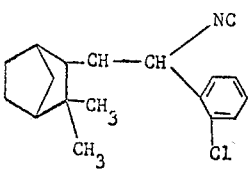

22. The compound N-4'-isocyanophenyl-1,4,5,6,7,7-hexachloro-bicyclo [2,2,1] Δ⁵-heptene-2,3-dicarboxylic acid imide having the formula

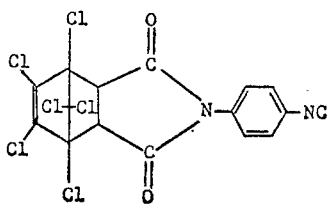

23. The compound 2-isocyano-tricyclo [2,2,1,0$^{3,5}$] heptane having the formula

24. The compound 3-isocyano-tricyclo-[5,2,1,0$^{2,6}$] dec-8-ene having the formula

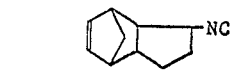

References Cited

UNITED STATES PATENTS 3,012,932   12/1961   Bussert et al. _____ 260—464

FOREIGN PATENTS 625,036   5/1963   Belgium.

OTHER REFERENCES

"A Novel Preparation of Isonitriles," Hertler et al., August 1958, Journal of Organic Chemistry, pp. 1221–1222

CHARLES B. PARKER, *Primary Examiner.*

S. T. LAWRENCE III, *Assistant Examiner.*

U.S. Cl. X.R.

167—30, 33; 260—326; 464, 465, 598, 599

UNITED STATES PATENT OFFICE
CERTIFICATE OF CORRECTION

Patent No. 3,419,546                        December 31, 1968

Uwe Fetzer et al.

It is certified that error appears in the above identified patent and that said Letters Patent are hereby corrected as shown below:

Column 11, TABLE 7, second and third columns, opposite (III''), insert -- 0 -- and -- 29 --, respectively; same column 11, lines 35 to 44, to the right of the formula insert -- (III''') --. Column 15, line 18, cancel "decene". Column 16, line 1, before "nitrogen" insert -- the --; line 21, claim reference numeral "2" should read -- 1 --; line 33, cancel "nonane".

Signed and sealed this 17th day of March 1970.

(SEAL)
Attest:

Edward M. Fletcher, Jr.                     WILLIAM E. SCHUYLER, JR.

Attesting Officer                               Commissioner of Patents